Patented July 28, 1942

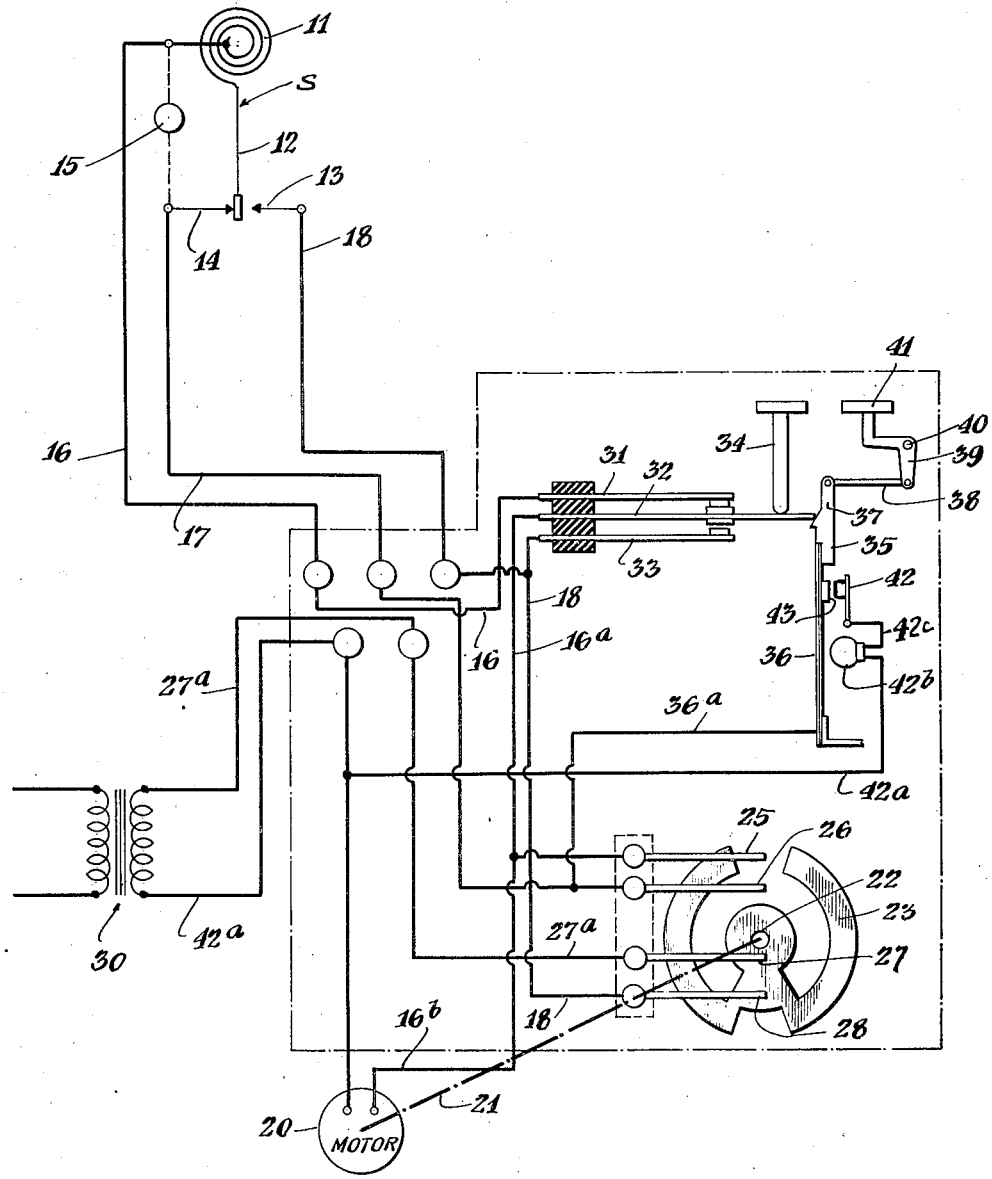

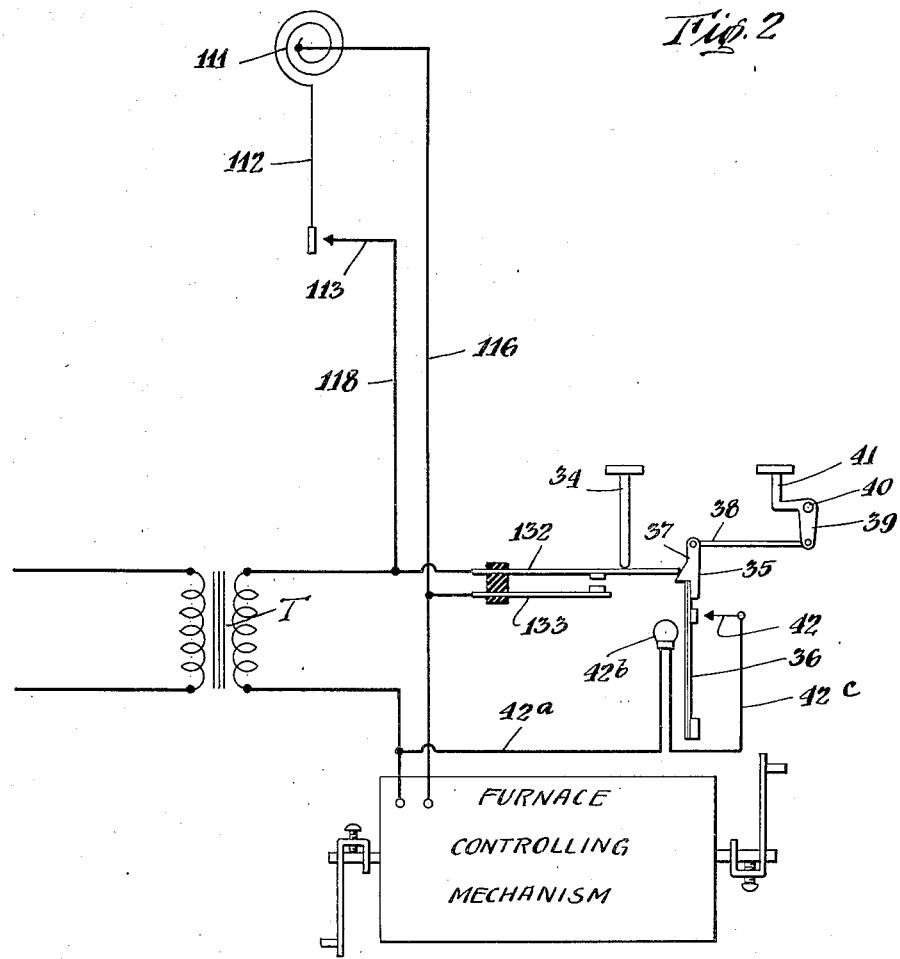
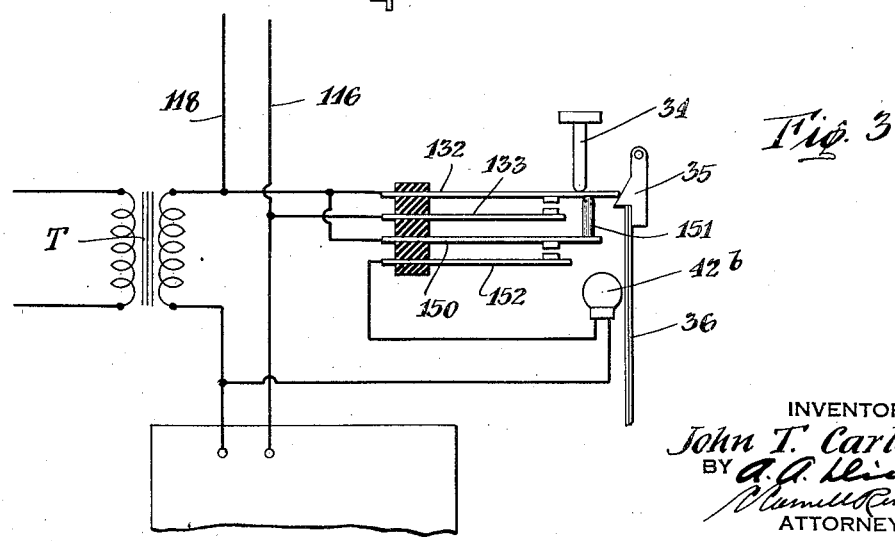

2,291,210

UNITED STATES PATENT OFFICE 2,291,210

TEMPERATURE REGULATING SYSTEM

John T. Carlson, Dayton, Ohio, assignor to The Master Electric Company, a corporation of Ohio Application July 2, 1940, Serial No. 343,544

3 Claims. (Cl. 236—68)

This invention relates to improvements in temperature regulating systems and has for an object to improve such systems by providing a basement switch so constructed and arranged that it will be automatically restored to normal position after a predetermined time.

Another object is to provide a basement switch which when moved from normal ineffective position to effective position is latched in such effective position together with automatic means for unlatching said switch after a predetermined time.

Another object is to provide such a device in which the unlatching is effected by thermal means.

Another object is to provide a signal light to indicate when the switch is in effective position.

Another object is to provide such a signal light so associated with a thermo responsive switch releasing means that heat therefrom will cause the releasing of the basement switch.

Other objects will appear from the following descriptions of two illustrative embodiments of the invention taken together with the attached drawings therein:

Fig. 1 shows more or less schematically a heat regulator system showing one manner of embodying the invention;

Fig. 2 shows a modified form of embodiment; and

Fig. 3 shows a further modified form.

Referring to Fig. 1 of the drawings, the letter S represents a thermostat of any known or suitable form, the one illustrated being of the type shown in Allen A. Dicke Patent 1,854,786 granted April 19, 1932. In the thermostat, the numeral 11 indicates any suitable thermo-responsive element such as a coil of bi-metal operating a contact blade 12 playing between the "heat" contact 13 and the "no-heat" contact 14, it being understood that when contact 13 is engaged, the regulator motor, which is usually located in the basement adjacent the furnace or other heat supply device is actuated to call for heat so that the draft damper is opened and the check damper closed, whereas when contact 14 is engaged the motor is operated to the no-heat position in which the drafts are closed and the check damper opened.

15 indicates a signal lamp so associated with the thermal element 11 as to give a heat anticipating effect, as will be clearly understood from said Patent 1,854,786.

Three conductors 16, 17, and 18 lead respectively from the thermal element, the no-heat contact 14 and the heat contact 13. The heat regulator motor proper comprises an electric motor 20 which through suitable connections including gearing designated diagrammatically by the dotted lines 21 serves to operate a shaft 22 which through the usual crank or cranks serve to control the dampers or otherwise effect control of the heating plant. Rotating with said shaft 12 is a commutator 23 which may be of the form shown. Associated with said commutator are brushes 25, 26, 27, and 28. The numeral 30 designates generally a source of current such as a transformer or battery.

The basement switch proper may comprise a single pole double throw switch which, in the form shown, consists of contact blades 31, 32, and 33, the blade 32 being biased upwardly so as to normally make contact with blade 31, but being capable of being flexed downwardly so as to disengage blade 31 and engage blade 33.

Any suitable manual operating means, such as the key 34, may act upon an extension of blade 32 so that through operation of said key the blade 32 may be flexed.

35 indicates a hook or other retaining abutment flexibly mounted so that during downward movement of blade 32, it is pushed out of the way but may spring back to a position where it overlies blade 32 and maintains it in the "effective position," i. e., where the contact with blade 31 is broken and with blade 33 established. The hook 35 is preferably carried by or may be made integral with a strip of bi-metal 36 so arranged that when its temperature is raised its upper end and hook 35 will be moved to the right to release blade 32 from its effective position and thus permit blade 32 to return to its shown normal position. In order to permit manual release the hook 35 may have an upward extension 37 extending out of the casing for manual operation or it may have connected thereto a link 38 connected to bell crank key lever 39 pivoted at 40 and having a portion 41 extending out of the casing for manual operation. 42 represents a contact so positioned that it may cooperate with a contact 43 carried by the arm 36. In the normal position shown, it does not engage contact 43 but when the key 34 is depressed and the blade 32 latched in effective position, contact 43 will have moved sufficiently far to cause contact 43 to bear against contact 42, the arm 36 or contact 42, or both, being sufficiently flexible for this purpose.

It will be noted that conductor 18 leads directly to brush 28 and also to the contact blade 33. Conductor 16 leads to contact blade 31 and conductor 16a leads from the contact 32 to the commutator brush 25. Conductor 27a leads from the transformer to the ground brush 27, a conductor 42a leads from the transformer to the motor and also to the lamp 42b from which leads the conductor 42c to the contact 42.

From the other terminal of the motor, conductor 16b connects with conductor 16a. A conductor 36a is connected from the catch supporting thermal metal arm 36 to the brush 26 which is connected through conductor 17 with the no-heat contact 14.

As shown, the thermostat switch blade 12 engages the no-heat contact 14 so that the regulator motor has moved to the no-heat position, i. e., drafts closed and check damper opened. If the temperature falls and blade 12 moves from contact 14 to the heat contact 13, a circuit will be made from the transformer through conductor 27a to brush 27, thence through the commutator 23 to the brush 28, through conductor 18 to contact 13 through blade 12, thermal coil 11, conductor 16, switch blades 31 and 32, conductor 16a, to the motor 20, and from thence through conductor 42a to the transformer, causing the motor to operate sufficiently long to rotate the shaft 22 and commutator 23 a half revolution. A resulting rise in the temperature will cause contact blade 12 to engage contact 14, thus establishing a circuit which will restore the parts to the position shown in the drawings. The purpose of the brush 25 is to provide an operation completing circuit. It is normally positioned in a cutout in the commutator 23 but engages therewith shortly after the start of an operation, whether draft closing or draft opening. The circuit is then as follows: From the transformer 30, through conductor 42a, motor 20, conductor 16b, brush 25, commutator 23, brush 27, conductor 27a, back to the transformer. This assures that if the contact should be broken at the thermostat after the operation has proceeded to a certain extent, the operation will be completed, i. e., continue until the brush 25 rides off the commutator into one of the opposed cutouts therein.

Assuming that the position of the parts is as shown and the user of the device desires to fire his furnace, which should only be done when the drafts are open and the check damper closed, he will press key 34 sufficiently far to break the contact between blades 31 and 32 and establish contact between blades 32 and 33 and to latch the blade 32 under the hook 35, thus causing contact 43 to engage contact 42. A circuit will therefore be established from the transformer through conductor 27a to the ground brush 27, commutator 23, brush 28, conductor 18, blade 33, blade 32, conductors 16a and 16b to the motor and thence through conductor 42a back to the transformer, causing the damper motor to operate one-half turn to open the drafts and close the check damper. As soon as the regulator motor has made this half turn operation, a circuit will be established from the transformer through conductor 27a, brush 27, commutator 23, brush 26, conductor 36a, arm 36, contacts 43 and 42, conductor 42c, lamp 42b, conductor 42a, back to the transformer, causing the lamp 42b to be illuminated, thus indicating that the basement switch is in effective position, the drafts open, and check damper closed.

Assuming that the user does not depress key 41 after he has finished firing the furnace, the lamp 42b will continue to burn until the heat emitted thereby has acted upon thermal metal arm 36 sufficiently long to cause it to move to the right, withdrawing hook 35 from blade 32. When this occurs, the circuits are restored to normal position and if the contact blade 12 of the thermostat engages the no-heat contact 14, the heat regulator motor will be caused to operate one-half revolution to restore the shaft 22, its connected crank arm and the commutator 23 to the position shown in the drawings.

In Fig. 2 is disclosed an application of the invention to a form of furnace controlling system of a simpler type in which only two wires lead from the thermostat to the furnace controlling mechanism. In said figure, the thermostat may consist of a thermal coil 111 of bi-metal, or other temperature responsive means, which operates a blade 112 capable of engaging the "heat" contact 113 when the temperature falls to a certain degree. The conductor 116 leads from the thermal coil to a furnace controlling mechanism adjacent the furnace whereas conductor 118 leads from contact 113 to transformer T and from thence to the furnace controlling mechanism. The latter may be of any usual type which, when current is supplied thereto causes the dampers to move from the no-heat to the heat position, it being understood that the parts thus far described may be of any well-known type.

In order to provide means to move the furnace controlling mechanism to the heat position, the basement switch now to be described may be employed:

The basement switch may consist of a single pole single throw switch comprising a contact blade 132 connected with conductor 118, and a blade 133 connected with conductor 116. The parts indicated by numerals 34, 35, 36, 37, 38, 39, 41, 42, 42a, 42b, and 42c, may have the same form and operate in the same manner as correspondingly numbered parts in Fig. 1, it being understood that conductor 42a is connected, as shown, with the conductor connecting one side of the transformer directly with the furnace controlling mechanism.

It will be understood that with the parts in the position shown, the draft damper is closed and the check damper is open. Upon the occurrence of a drop in the temperature to be controlled, blade 112 will engage contact 113, thus establishing a circuit from the transformer through the parts 118, 113, 112, 111, and 116 to the furnace controlling mechanism and therefrom back to the transformer, causing said mechanism to operate to a position where the draft damper is opened and the check damper closed. It will also be understood that if, with the parts in the position shown, the key 34 is depressed so that blade 132 is latched under hook 35, a parallel circuit will be established, causing the furnace controlling mechanism to open the draft damper and close the check damper and that at the same time contact 43 will engage contact 42, establishing a circuit from the transformer through lamp 42b indicating that the basement switch has been moved to effective position and causing the bi-metal blade 36 to be subjected to heat from said lamp so that, unless manually released through key lever 41, the blade 132 will be released from hook 35 by the flexing of the bi-metal 36 after a predetermined time.

Fig. 3 shows a modified form of construction in which the lamp circuit is closed not by movement of the bi-metal arm 36 but by movement of blade 132. This is accomplished by providing a contact blade 150 actuatable by movement of blade 132, as through an insulating strut 151, and a contact blade 152, with which blade 150 may contact. Therefore, when the key 34 is depressed not only is there a circuit established in parallel with the thermostat to actuate the furnace controlling mechanism to open draft position but a circuit is also established between blades 150 and 152 through lamp 42b. When the blade 132 is released from hook 35 either by manual operation thereof or by flexure due to heat from the lamp, the blades 150 and 152 are disengaged, thus causing the lamp to be extinguished. While this form of lamp switch has been shown as applied to the form of construction shown in Fig. 2, it may obviously also be used with the form shown in Fig. 1.

It will be seen that by the illustrative means shown and described two very satisfactory and convenient automatic basement switches have been provided which may be either manually released by the user or which will be automatically restored to its normal ineffective position after a predetermined time.

Having described two illustrative embodiments of the invention it is pointed out that various changes and modifications therein may be made without departing from the invention as set forth in the following claims.

I claim:

1. In a temperature regulating system an electrically operated furnace controlling mechanism adapted to control the furnace for increased heat or decreased heat delivery, a thermostat for controlling the actuation of said mechanism, a single pole double throw manually operable basement switch having an element which is normally biased to contact one of its poles to establish a circuit whereby the thermostat controls the damper controlling mechanism according to the temperature at the thermostat but which when moved to contact its other pole causes the furnace controlling mechanism to control the furnace for increased heat delivery, means for latching said switch element in the second mentioned position, thermo responsive mechanism for unlatching said switch element after a predetermined time interval and heating means associated with said thermo responsive mechanism effective when said basement switch is in said second mentioned position and the damper controlling mechanism is in the increased heat position.

2. In a temperature regulating system an electrically operated furnace controlling mechanism adapted to control the furnace for increased heat or decreased heat delivery, a thermostat for controlling the actuation of said mechanism, a single pole double throw manually operable basement switch having an element which is normally biased to contact one of its poles to establish a circuit whereby the thermostat controls the damper controlling mechanism according to the temperature at the thermostat but which when moved to contact its other pole causes the furnace controlling mechanism to control the furnace for increased heat delivery, means for latching said switch element in the second mentioned position, thermo responsive mechanism for unlatching said switch element after a predetermined time interval, heating means associated with said thermo responsive mechanism, a second switch arranged to be closed when the first switch element is latched in position, said heating means and said second mentioned switch being so connected that said heating means is energized when said basement switch is in said latched position and the damper controlling mechanism is in the increased heat position.

3. In a temperature regulating system an electrically operated furnace controlling mechanism adapted to control the furnace for increased heat or decreased heat delivery, a thermostat for controlling the actuation of said mechanism, a single pole double throw manually operable basement switch having an element which is normally biased to contact one of its poles to establish a circuit whereby the thermostat controls the damper controlling mechanism but which when moved to contact its other pole causes the furnace controlling mechanism to control the furnace for increased heat delivery, means for latching said switch element in the second mentioned position, thermo-responsive mechanism for unlatching said switch element after a predetermined time interval comprising a bi-metallic member and heating means associated with said bi-metallic member effective when said basement switch is in said second mentioned position and the damper controlling mechanism is in the increased heat position, whereby when the bi-metallic member is heated by said heating means it will withdraw said latch permitting the thermostat to again control said furnace controlling mechanism, which in its first movement to decreased heat position breaks the circuit to said heating means and permits the latch to return to its original normal position.

JOHN T. CARLSON.